Oct. 15, 1968          M. G. BLOCH          3,405,550
CHROMATOGRAPHIC METHOD AND APPARATUS FOR DETERMINING
TRACE CONCENTRATIONS OF WATER
Filed Dec. 31, 1964          2 Sheets-Sheet 1

INVENTOR.
*Morton G. Bloch*

INVENTOR.
*Morton G. Bloch*

United States Patent Office 3,405,550
Patented Oct. 15, 1968

3,405,550
CHROMATOGRAPHIC METHOD AND APPARATUS FOR DETERMINING TRACE CONCENTRATIONS OF WATER
Morton G. Bloch, Woodbury, N.J., assignor to Mobil Oil Corporation, a corporation of New York
Filed Dec. 31, 1964, Ser. No. 422,858
15 Claims. (Cl. 73—23.1)

ABSTRACT OF THE DISCLOSURE

The water content in a hydrocarbon stream is determined by passing the stream through a chromatographic column to absorb a sample of the stream therein. By gas elution the sample is passed from the chromatographic column, split into two paths, and simultaneously passed through a pair of chromatographic columns. Each of the pair of chromatographic columns contains a different concentration of water-absorbing material which delays primarily the passage of water through each of the pair of columns for a different length of time. Thermistors forming opposing arms of a Wheatstone bridge monitor the exit ends of the pair of columns whereby the effect of hydrocarbon background is nulled and a composite signal indicative of water content is provided.

---

This invention relates to a novel apparatus and method for chromatographic analysis of a component in a sample stream. In this invention the amount of a trace component in a sample stream is determined by passing a sample through parallel chromatographic columns which differentially delay primarily the component to be analyzed. In effect, the contributions of the other components are nulled; thus the amount of the trace component in a multicomponent sample stream is more readily determined.

Chromatographic columns are widely used for the separation and analysis of many chemical mixtures. Components of these mixtures are separated by differential passage over a bed of solids or liquids in a chromatographic column and are carried through the column by means of an eluting fluid. The different absorption and desorption characteristics of the components account for their differential rate of passage through the column. The eluate may, for example, be detected by thermistors, comprising beads heated by electric currents, at the exit end of the chromatograph. In this method heat is conducted away from a hot body, the bead situated in the gas, at a rate depending primarily on the thermal conductivity of the gas. These factors determine the temperature of the bead and thus its resistance, which is measured. It is readily seen that such a procedure is relatively useless where the components of a mixture are not completely separated and the thermistor reading is not quantitatively indicative of the component sought. For the complete separation of some substances very long columns and extensive elution periods are required. However, this leads to a broadening of the component band and associated dilution and consequent sensitivity loss. For the determination of trace components, a large amount of the sample stream must be concentrated to a manageable volume and then analyzed. However, in the analysis of such samples the presence of the trace component is substantially masked by the bulk of the sample. Even a relatively selective absorption of the trace component from the sample results in an asymptotic tailing of the bulk material which drastically interferes with said separation. The present invention is designed to overcome these and other disadvantages of conventional methods and apparatus. This invention provides for the detection of selected components of a mixture without complete physical separation from the interfering components.

A particular embodiment of this invention is the detection of water in a hydrocarbon stream. The accurate determination of water in hydrocarbon gases has been a persistent problem in industrial and laboratory analyses. Specialized columns for the separation of water are not entirely adequate. Where measurement of the amount of water is required, the sample stream may be passed over calcium carbide, wherein the water is converted to acetylene which is then measured by conventional chromatographic techniques. However, this method has its drawbacks, such as incomplete reaction and side reactions with the remaining components in the sample stream.

Another method for determining the water content in a hydrocarbon stream involves a laboratory analysis in which a so-called Karl Fischer reagent is reacted with a sample; the water content is determined by titration. The active substances of the reagent are sulphur dioxide and iodine dissolved in a mixture of methanol and pyridine. The change in iodine content is in a definite ratio to the water that is present. However, this procedure is quite complicated and time consuming.

A variety of other techniques have been suggested, among which is the coulometric method. In this method a substantially nonconducting film of hygroscopic material, such as phosphorous pentoxide, is deposited between electrodes mounted in a sample stream. As current from an applied voltage flows across this film, absorbed water is electrolyzed to hydrogen and oxygen, which regenerates the hygroscopic material. The electric current that flows is a measure of the rate of moisture absorption in accordance with Faraday's law. This method has led to plugging difficulties in on-stream operations and inaccuracies, in particular, due to recombination of the oxygen and hydrogen generated with hydrogen or oxygen in the sample stream which interferes with the measurement of moisture in the sample.

Similar methods have been developed which rely upon variations in the capacitance of a dielectric comprised of a desiccant in the sample stream. The desiccant absorbs or gives up moisture to rain in equilibrium with the stream moisture content and thus the capacitance of a cell comprising the desiccant is a function of the stream moisture content. However, the accuracy of this device in practice has not been entirely satisfactory, especially as it does not measure water alone and so cannot be calibrated directly.

It is therefore an object of this invention to provide an improved method and apparatus for the chromatographic analysis of trace components in a sample stream.

It is a further object of this invention to provide an improved method and apparatus for the chromatographic analysis of trace amounts of water in a petroleum hydrocarbon stream.

Briefly, this invention is a chromatographic system, comprising an absorption column followed by a parallel pair of columns, both of which exhaust to separate sensing elements which are wired in opposing arms of a Wheatstone bridge. This invention combines strongly preferential and readily reversible absorption of a desired substance with its subsequent elution through a parallel dual-flow chromatographic system which nulls the interference of the continuous background spectrum of components of a sample mixture which are not entirely separated from the component which is to be analyzed. The absorption column is designed to absorb a maximum of the component sought and a minimum of the other components. The parallel columns are designed to differentially delay the component sought by delaying the component sought for different times by means of different concentrations of the absorbent material and to quickly pass the other components. The method of this invention involves passing a fluid sample (or fluid transfer media from solid samples) through the absorption column to selectively absorb the desired component while rejecting most of each of the other components, removing the rejected material, subsequently eluting the desired component together with the coabsorbed and coeluted minor portions of the other components, splitting the eluent stream and simultaneously passing it through both of the parallel columns, so that the signals generated by the individual sensors cancel by simultaneous opposition the dual contributions of the unwanted components, and a read-out at high sensitivity of the signal corresponding to the desired component as it emerges first from one and then from the other parallel column is obtained.

This invention will be described in greater detail by reference to the following figures.

Figure 3:
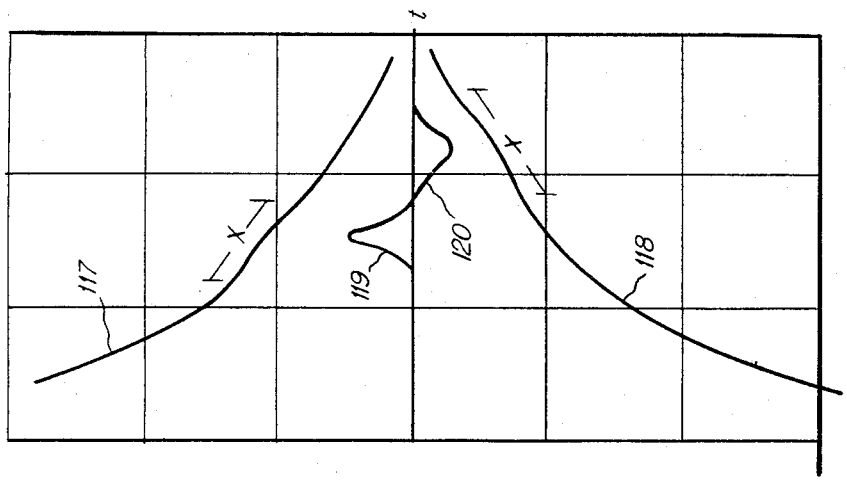
FIGURE 3 is a graphical representation of the output from the detecting thermistors of this invention, against time.

The major components of this system are a carrier gas conduit 101, a sample inlet means 102, stream splitting conduits 103 and 104, chromatographic columns 105 and 106, detectors 107 and 108 in their respective effluents, and Wheatstone bridge and recorder to indicate the passage of sample components over the detectors. This system is further described by reference to its following method of operation.

Figure 2:
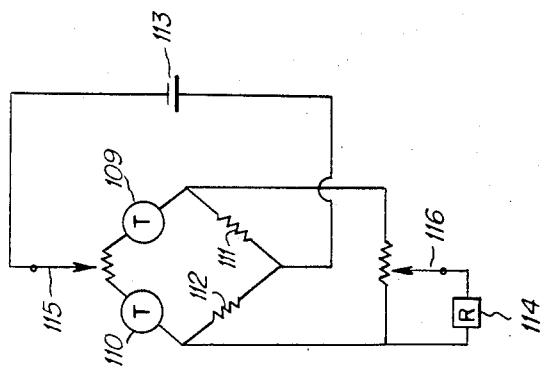
FIGURE 2 is a schematic representation of the detector circuit employed in this invention.

This invention may be carried out by initially passing a carrier, or eluting, gas into the system at the inlet 101. A mixture to be analyzed is inserted into the carrier gas at 102. The sample inlet 102 preferably comprises a removable portable chromatographic column that has selectively absorbed the desired material by frontal chromatography of the unexpanded sample stream therethrough. The absorbed material subsequently is desorbed by the stream of relatively low density elution gas from 101. Alternatively, a much smaller sample quantity may be injected directly at 102 into the low density elution carrier gas. The carrier gas and sample are split into two streams, which flow simultaneously into conduits 103 and 104 and then respectively to columns 105 and 106. The effluent streams are monitored by detectors 107 and 108. As explained in greater detail later, columns 105 and 106 differentially delay primarily the component of the mixture which is to be analyzed. Detectors 107 and 108 may be, for example, thermistors, which are arranged in a Wheatstone bridge as shown in FIGURE 2. The thermistors, 109 and 110, are disposed in opposite legs of a Wheatstone bridge, each leg additionally containing a fixed resistor 111 and 112. A power supply, 113, provides an electrical potential across the bridge, and a recorder, 114, indicates the difference in potential across the legs of the Wheatstone bridge. Potentiometers 115 and 116, are provided in the circuit to initially balance the Wheatstone bridge, and to attenuate the output signal, respectively.

Figure 1:
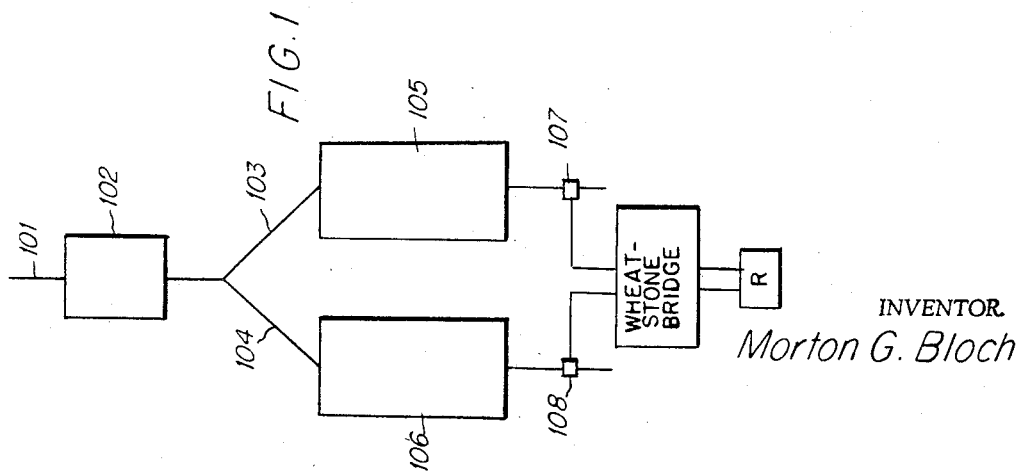
FIGURE 1 is a representation of the chromatographic arrangement of the present invention.

The procedure employed in this invention comprises passing a carrier gas through the chromatographic apparatus depicted in FIGURE 1 and balancing the Wheatstone bridge. Since the effluent through columns 105 and 106 is identical in composition, temperature and flow rate, the output of the detector thermistors is similar. The thermistors in the bridge circuit produce opposing signals and thus, if the bridge was initially balanced, the recorder indicates a zero potential difference across the legs of the Wheatstone bridge. The sample mixture, upon insertion into the carrier gas flow stream, is eluted past and detected at 107 and 108. In the output of a recording instrument in a convenitonal system, trace components which are absorbed from samples made up of a continuous spectrum of isomers and homologues, such as petroleum streams, would be superimposed on a very substantial and very rapidly changing background caused by coabsorbed and coeluted major components of the original sample. An accurate quantitative determination of the amount of this trace component is not practical from such a record. In this invention, due to the fact that columns 105 and 106 are designed to differentially delay only the trace component, thermistors 107 and 108 generate a signal tentatively indicated by lines 117 and 118. The portions of these lines indicated by $x$ are representative of the differentially-time-delayed trace component. In actuality by means of the Wheatstone bridge arrangement, the signals generated by the thermistors are electrically opposed to yield a total signal indicated by 119 and 120. These latter signals are directly proportional to the amount of trace components in the sample mixture. Thus, in effect, the background mixture has been eliminated from the recorded curves 117 and 118. It should be realized that curves 117 and 118 are on a much reduced scale in comparison to curves 119 and 120 for graphical representation.

This invention has proved to be of particular significance in the determination of trace amounts of water in hydrocarbon streams such as in platinum reformer recycle gas.

In a particular embodiment of this invention a determination was made of the moisture in a recycle gas sample from a catalyst testing unit. A mass spectrographic analysis of the process recycle gas stream gave its composition as follows.

| Component: | Weight, percent |
| --- | --- |
| Hydrogen | 22.9 |
| $C_1$ | 13.8 |
| $C_2$ | 20.1 |
| $C_3$ | 22.4 |
| $C_4$ | 14.6 |
| $C_5$ | 4.6 |
| $C_6$ | 1.5 |
| Misc. | 0.1 |

A portable chromatographic absorption column, 1.25 inches long by 0.20 inch inside diameter, packed with 10% weight glycerol on 42–48 mesh Chromosorb W (an agglomerated diatomaceous earth), was purged with an excess of this gas expanded to atmospheric pressure. The absorption column was then exposed to sample gas at full process pressure, at 40° C. This high pressure gas sampling maximized water absorption by crowding more sample into the water-breakthrough-volume of the absorption column. The actual volume of the sample was 40.3 ml. The glycerol completely absorbed the water; the excess sample pressure was released and the column was sealed. Previously, the sample stream was frontally chromatographed to incipient water breakthrough at process pressure and temperature to determine the capacity of the absorption column and to insure complete retention of the sample's moisture content. The splitter columns and detector were back flushed during the absence of the absorption column. After reconnecting the absorption column, its ends were flushed with helium to prevent interference from atmospheric moisture. The columns were then connected as shown in FIGURE 1. The splitter columns were 2.5 inches in length by 0.10 inch inside diameter and comprised 3% and 20% weight glycerol, respectively, on 42–48 mesh Chromosorb W. The glycerol concentration is stated relative to the weight of the supporting solid. Helium at 15 p.s.i.a. was passed through the absorption column at a rate of 200 ml./minute.

Water thus absorbed from a sample is eluted by helium at about the same absolute concentration per unit volume of helium that existed in the sample (g.H₂O/gaseous ml.). This multiplies the relative concentration of eluent water by the ratio of [mols of sample/ml. of sample] to [mols of helium/ml. of helium], under actual operating conditions. For example, this ratio is 240 for liquid n-butane and 35 for a 500 p.s.i.g. ideal gas. $H_2S$, $NH_3$ and HCl do not interfere, as $H_2S$ and $NH_3$ emerge before the first water peak and HCl emerges just after it.

Figure 4:
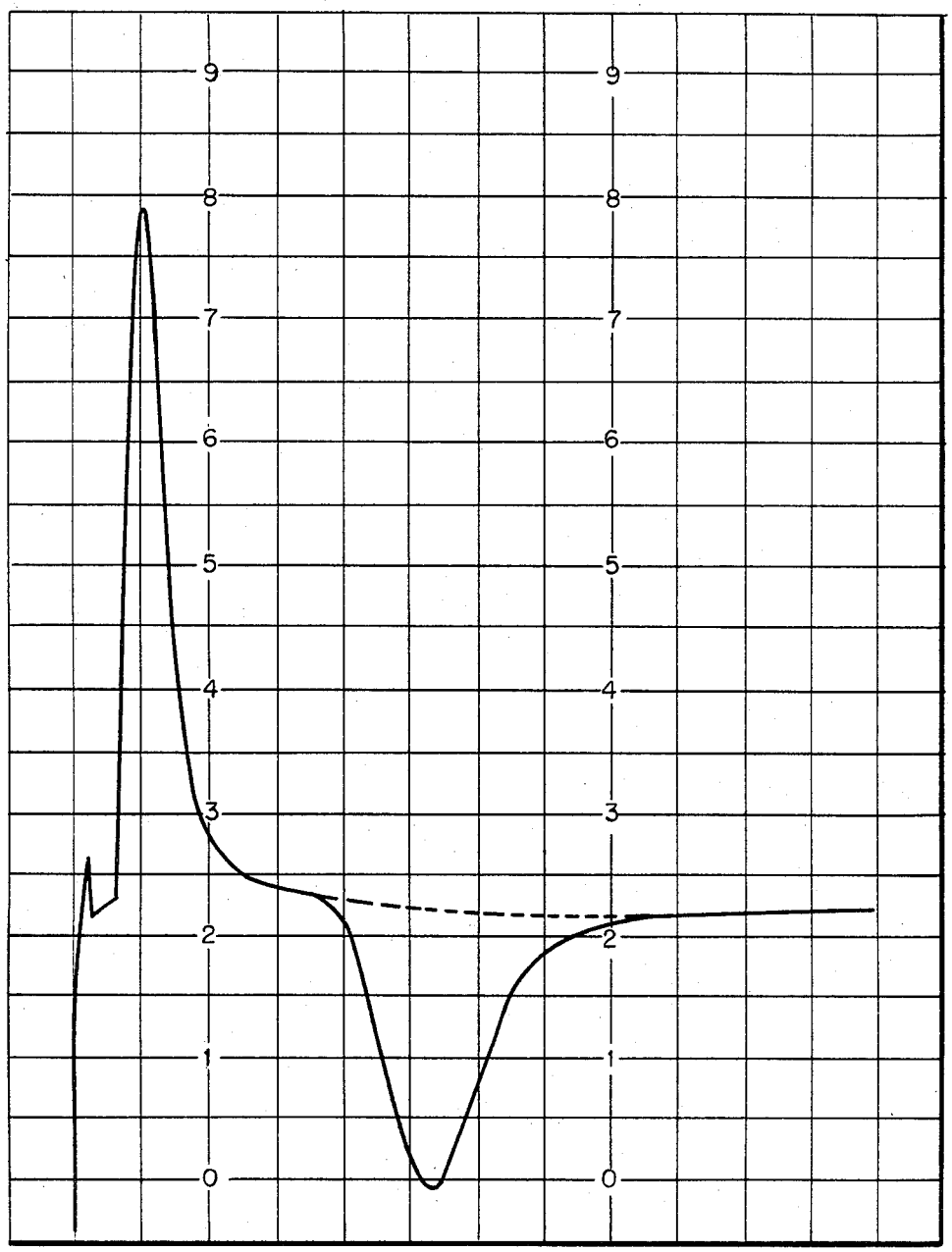
FIGURE 4 is a graphical representation of the output from a recorder which illustrates a particular embodiment of this invention, in which the ordinate represents the output in millivolts and the abscissa represents time, in minutes.

Coabsorbed hydrocarbon components were eluted asymptotically from the absorption column rather than as the usual peaks. This potential interference was controlled by the predetection split-flow dual-gas-chromatographic-column system depicted in FIGURE 1. The dual columns which contain different concentrations of water absorbent glycerol differentially delayed substantially only the water. The effluent from each one was monitored by a thermistor. These were wired in opposing arms of a Wheatstone bridge, FIGURE 2. The hydrocarbons virtually balanced out and two water peaks emerged, as shown in FIGURE 4. The readout system shown gave first a positive water peak and then a negative one, either or both of which may be used to calculate the water content of the sample. By calculating the area under the curves in FIGURE 4 and calibrating the system by injecting liquid containing a known amount of water through the columns, the amount of water was determined to be 39.9 p.p.m. (mol/mol).

This procedure was repeated for a 500 p.s.i.g. gas from a catalytic reformer and for liquid butene-1 from a storage cylinder which respectively registered 100 p.p.m. and 56 p.p.m. $H_2O$ (mol/mol).

This procedure has been found to accurately measure components in gaseous streams and in liquid streams that are immiscible with the absorbent. This invention is not limited to hydrocarbon streams, but may also be used to determine the humidity in the atmosphere. As little as $0.4\mu$ Hg water partial pressure or 0.2 p.p.m. water in 500 p.s.i.g. gas and about 1 p.p.m. water in 150 p.s.i.g. gas has been detected in this way.

Gas-liquid or liquid-liquid frontal chromatography is used during the absorption step, followed by purging of atmospheric moisture from the end-closures, and then by gas-flow elution of the absorbed water. For instance, p.p.m. water in gasoline can be obtained by percolating it through a column containing 10% glycerol that previously had been gas-dried, flushing with a dry liquid hydrocarbon, such as isobutane and then eluting with helium.

Other trace components can be similarly concentrated by using suitably selective immobile liquid phases. For instance, the use of a preferably longer 10% glycerol column or diethanolamine will permit the detection of ammonia. This invention is suitable for the detection of various other components such as mercaptans and hydrogen sulphide. Additionally, more than one component in a sample stream may be detected in a single analysis cycle.

The absorbent material may comprise two elements having different affinities for the bulk sample and the desired components. The elements may consist of a relatively slow equilibration element, such as a diatomaceous earth, and a relatively fast equilibration element, for example, a liquid such as glycerol. In the above example a glycerol partitioning agent supported by Chromosorb W, a diatomaceous earth, was used as the water-absorbing stationary phase. The amount of glycerol may vary from about 1% to as much as the supporting solid can sustain in one column, preferably from about 1 to 20%, and the ratio of glycerol in the two columns may vary from 1:2–20. Any other partitioning agent is suitable which readily equilibrates with solute water or other component to be analyzed and does not substantially affect the hydrocarbon stream or other background stream. In view of the overwhelming amount of the background stream it normally does not appear to be affected after the first few seconds of passage through the splitter columns.

In the analysis of a hydrocarbon stream, particularly one comprising liquid components, one or more pre-absorber columns in series may be used prior to eluting the absorbed components into the parallel detector (splitter) columns. In refinery applications it has been found that reformer-gas samples often are not entirely free of liquid-phase hydrocarbons. Carryover of these liquids into the absorption column can multiply the quantity of hydrocarbons taken up more than a thousand-fold. This saturates the elution helium with their vapors. Such a concentration of hydrocarbons reduces the effectiveness of the splitter system. However, the quantity of hydrocarbons can be reduced to a more suitable level by reabsorbing the water eluted from the first absorption column in a second one. Since the second one is not contaminated by liquid-phase hydrocarbons, the reabsorbed water can be eluted through the splitter system with a satisfactory nulling effect.

This technique was used to extend the invention to normally-liquid hydrocarbons. Thus, dissolved and suspended water in liquid gasoline was absorbed by percolating it through an absorption column. After bleeding off the liquid gasoline in the column, the water was eluted into a second absorption column. This reabsorbed water then was eluted through the splitter columns with the usual level of coeluted hydrocarbons. The originally absorbed and eluted water is reabsorbed by the second column as though it was contained in a reformer-gas free of any liquid phase. This technique may be extended to heavier-than-gasoline liquid hydrocarbons, such as transformer oils and lube stocks.

Thus this invention provides a method and apparatus broadly applicable to the determination of selected components in a sample stream. The splitter columns which respectively differentially delay the components to be analyzed and the detection means which null the background stream constitute a substantial improvement in the field of chromatographic analysis. The use of a portable absorption column with a stable detection system is also of great significance. This invention is of particular significance in the determination of trace components, such as water, in a hydrocarbon stream.

The invention has been described in terms of specific embodiments set forth in detail, but it should be understood that these are by way of illustration only and that the invention is not necessarily limited thereto. Alternative constructions will become apparent to those skilled in the art in view of this disclosure and, accordingly, modifications of the apparatus and process disclosed herein are to be contemplated within the spirit of this invention.

I claim:

1. In a gas chromatographic apparatus for detecting at least one component in a sample stream, the improvement which comprises: (1) means for dividing said stream to simultaneously form two flow paths, (2) a chromatographic column in each of said flow paths which differentially delays primarily the passage of said one component through said columns such that said one component emerges at different times from each of said columns, (3) a detecting device in each of said flow paths at the exit ends of said columns, and (4) a measuring bridge circuit including said detecting devices, wherein said detecting devices generate opposing signals indicative of the total sample passing through each of said chromatographic columns and the difference between said signals indicates the quantitative differential passage of said one component.

2. The apparatus of claim 1 in which said chromatographic columns comprise a supporting solid and a liquid partitioning agent thereon wherein the concentration of said liquid in said columns is sufficiently different to substantially differentially delay only the passage of said one component.

3. The apparatus of claim 1 further comprising a portable chromatographic column for transporting a sample therein, means for removably connecting said portable column upstream of said stream dividing means, and means for eluting said sample from said portable column to thereby form said sample stream.

4. In a gas chromatographic apparatus for detecting the amount of water in a hydrocarbon stream, the improvement which comprises: (1) means for dividing said stream to simultaneously form two flow paths, (2) a chromatographic column in each of said flow paths, and chromatographic columns comprising sufficiently different amounts of absorbent partitioning agent to differentially delay primarily the passage of water vapor through said columns such that water vapor emerges at different times from each of said columns, (3) a detecting device in each of said flow paths at the exit end of said columns, and (4) a measuring bridge circuit including said detecting devices, wherein said detecting devices generate opposing electrical signals indicative of the total sample passing through each of said chromatographic columns and the difference between said signals indicates the quantitative differential passage of water vapor.

5. The apparatus of claim 4 wherein said absorbent partitioning agent is glycerol upon a diatomaceous earth.

6. A gas chromatographic method of determining the amount of at least one component in a sample stream which comprises the steps of: (1) simultaneously passing said stream in two flow paths through separate chromatographic columns which differentially delay only said one component such that said one component emerges at different times from each of said separate chromatographic columns, (2) monitoring the flow path at the exit end of each of said separate chromatographic columns, and (3) generating opposing signals indicative of the total sample passing through each of said separate chromatographic columns, whereby the difference between said signals is indicative of the quantitative differential passage of said one component through said separate chromatographic columns.

7. The method of claim 6 further comprising prior to step (1) the steps of passing a stream through a further chromatographic column to absorb a sample therein and eluting said sample therefrom to provide said sample stream.

8. The method of claim 6 wherein prior to step (1) a stream is passed into a further chromatographic column to absorb a sample therein and said sample is eluted from said further chromatographic column to provide said sample stream, and wherein said separate chromatographic columns each comprise a supporting solid and a liquid partitioning agent on said supporting solid, the concentration of said liquid in each of said separate chromatographic columns being sufficiently different to substantially differentially delay only the passage of said one component.

9. The gas chromatographic method of determining the amount of water in a hydrocarbon sample which comprises the steps of: (1) simultaneously passing equal volumes of said sample in two flow paths through separate chromatographic columns which differentially delay substantially only water vapor therein, such that the water vapor emerges at different times from each of said separate chromatographic columns, (2) monitoring the flow path at the exit end of each of said separate chromatographic columns, and (3) generating opposing signals indicative of the total sample passing through each of said separate chromatographic columns, whereby the difference between said signals is indicative of the quantitative differential passage of water vapor through said separate chromatographic columns.

10. The method of claim 9 further comprising prior to step (1) passing a hydrocarbon stream through a further chromatographic column to absorb said sample therein, and eluting said sample therefrom.

11. The method of claim 9 wherein prior to step (1) a hydrocarbon process stream is passed at process pressure into a further chromatographic column to absorb said sample therein, and said further chromatographic column is operatively connected to said separate chromatographic columns; and wherein step (1) comprises gas eluting said absorbed sample from said further chromatographic column and through said separate chromatographic columns, the eluting gas being passed through said further chromatographic column and said separate chromatographic columns at a pressure substantially below the process pressure of said hydrocarbon process stream.

12. The method of claim 9 wherein prior to step (1) a hydrocarbon stream comprising liquid phase components is passed through a first chromatographic column and the absorbed portion of said hydrocarbon stream is then gas eluted from said first chromatographic column and through a second chromatographic column to absorb said sample in said second chromatographic column; and wherein step (1) comprises gas eluting said absorbed sample from said second chromatographic column and through said separate chromatographic columns.

13. A gas chromatographic method of determining the amount of water in a petroleum hydrocarbon sample which comprises the steps of (1) simultaneously passing equal volumes of said sample in two flow paths through separate chromatographic columns which comprise a supporting substance and glycerol thereon, wherein the concentration of said glycerol in said separate chromatographic columns is sufficiently different to substantially delay the passing of water vapor therethrough such that water vapor emerges at different times from each of said separate chromatographic columns, (2) monitoring the flow path at the exit end of each of said separate chromatographic columns, and (3) generating opposing signals indicative of the total sample passing through each of said separate chromatographic columns, whereby the difference between said signals is indicative of the quantitative differential passage of water vapor through said separate chromatographic columns.

14. The method of claim 13 wherein prior to step (1) a petroleum hydrocarbon stream is passed through a further chromatographic column to absorb said sample therein, and wherein step (1) comprises eluting said absorbed sample from said further chromatographic column and through said separate chromatographic columns.

15. The method of claim 13 wherein prior to step (1) a petroleum hydrocarbon stream comprising liquid components therein is passed through a first chromatographic column and the absorbed portion of said hydrocarbon stream is then eluted from said first chromatographic column through a second chromatographic column to absorb said sample in said second chromatographic column; and wherein step (1) comprises gas eluting said absorbed sample from said second chromatographic column and through said separate chromatographic columns.

References Cited

UNITED STATES PATENTS

| | | | |
|---|---|---|---|
| 2,790,016 | 4/1957 | Lanneau | 73—61.1 X |
| 3,056,277 | 10/1962 | Brenner | 73—23.1 |
| 3,080,746 | 3/1963 | Nerheim | 73—61.1 |
| 3,111,837 | 11/1963 | Evans et al. | 73—61.1 |
| 3,112,640 | 12/1963 | Platt | 73—23.1 |
| 3,257,609 | 6/1966 | Sanford et al. | 73—29 X |
| 3,263,493 | 8/1966 | Davidson | 73—61.1 |
| 3,192,473 | 6/1965 | Marsh | 73—23 XR |

OTHER REFERENCES

Merritt et al.: Analytical Chemistry, vol. 34, No. 8, July 1962, pp. 908–913.

RICHARD C. QUEISSER, *Primary Examiner.*

C. A. RUEHL, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,405,550                      October 15, 1968

Morton G. Bloch

It is certified that error appears in the above identified patent and that said Letters Patent are hereby corrected as shown below:

Column 2, line 42, "rain" should read -- remain --. Column 3, line 35, before "Wheatstone" insert -- a --. Column 4, line 5, "convenitonal" should read -- conventional --. Column 7, line 8, "and" should read -- said --.

Signed and sealed this 3rd day of March 1970.

(SEAL)
Attest:

Edward M. Fletcher, Jr.                     WILLIAM E. SCHUYLER, JR.

Attesting Officer                            Commissioner of Patents